Dec. 23, 1952     N. E. LEE     2,622,836
MOUNTING
Filed July 7, 1945     2 SHEETS—SHEET 1
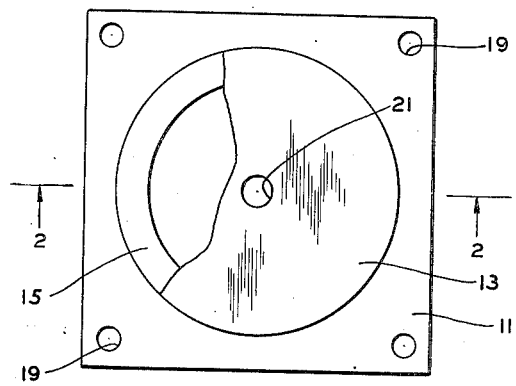
FIG. 1.
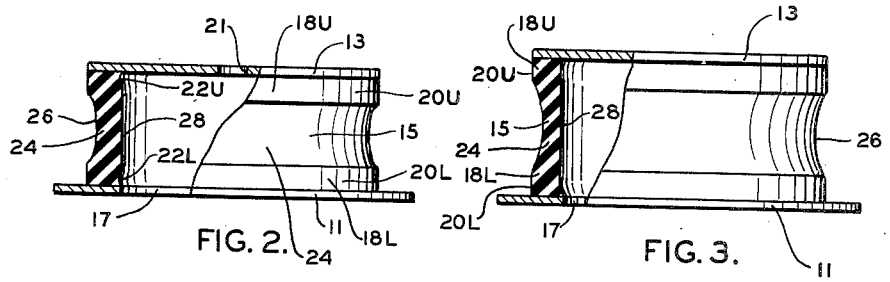 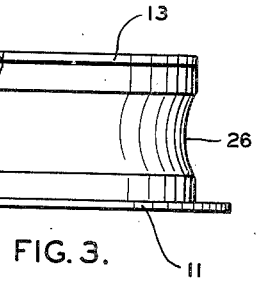
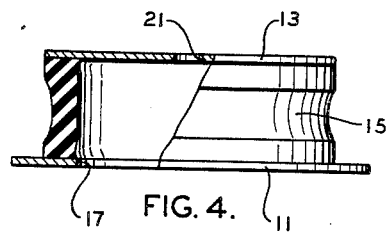 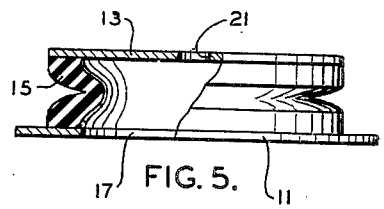
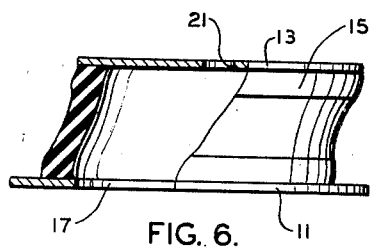
*INVENTOR.*
NORMAN E. LEE
BY
*William D. Hall*
ATTORNEY Dec. 23, 1952 N. E. LEE 2,622,836
MOUNTING
Filed July 7, 1945 2 SHEETS—SHEET 2

INVENTOR.
NORMAN E. LEE
BY
William D. Hall
ATTORNEY

Patented Dec. 23, 1952

2,622,836

UNITED STATES PATENT OFFICE 2,622,836

MOUNTING

Norman E. Lee, Forest Hills, N. Y.

Application July 7, 1945, Serial No. 603,731

12 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent, or at least minimize, the transmission of vibrations, shocks and noises from said load to said base, and vice versa.

Some installations require mounts which will protect against a number of different kinds of impulses. For instance, in aircraft sensitive apparatus must be shielded from forced vibrations of the engines and associated parts, at various speeds, including that speed at which there are generated vibrations of the resonant frequency of the mounted equipment, and also from shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies, vibrations due to substantially uniform, minor irregularities of the road beds traversed by the vehicles, which usually have abrupt wave-forms, and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections in only one direction of movement, such as vertical, and are therefore unsuited to installations requiring attenuation in several directions.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

Some mounts put a tensile loading on the spring material, which results in greater drift and greater sensitivity to injury than other types of loading.

In some mounts, oscillations persist and add to later oscillations so as to amplify rather than reduce them.

It is intended by the present invention to provide shock and vibration supports which are not attended by defects of earlier mounts.

It is an object of the present invention to provide means of supporting equipment which will satisfactorily isolate and absorb vibrations and shocks of various frequencies.

It is also an object to provide a mount which may be stiff enough so as not to unduly amplify low frequency and resonant frequency oscillations, but still soft enough to attenuate high frequency oscillations and thrusts of great force, without giving rise to countershocks.

It is a further object to provide supporting means which will cushion displacements in different directions, such as vertical, horizontal and rotational.

Still another object is to provide mounts having external dimensions which allow them to be substituted for presently manufactured mounts without necessitating structural changes in either the base or the load.

A still further object is to provide mounts designed to absorb and attenuate shocks to such a degree as to eliminate the need of snubbers and thereby avoid the violent countershocks frequently caused thereby.

It is still another object to provide mounts wherein metal to metal contacts are eliminated and hence the transfer of sound, as well as vibration and shock, is inhibited.

It is also an object to provide a mount which, despite unusual vibrations and shocks, and wear and tear, will not allow the equipment sustained thereby to tear loose entirely from the base.

It is another object to eliminate tensile loading of the spring material and the disadvantages resulting therefrom.

Generally, a mounting embodying the present invention includes a spring element, of a resilient, flexible material (such as natural or synthetic rubber). Said spring element includes an active or effective portion (which in some embodiments may be the entire spring element) which portion I have chosen to call the "buckling column" portion. When such a "buckling column" portion is subjected to loading (as in the form of a shock) in an axial direction, it is initially relatively stiff and gets softer (per unit of deflection) and finally gets stiff again at extreme amplitudes. Such a "buckling column" portion is preferably tubular in shape, and is first put into compression and acts as a "column," and then collapses and goes into flexure. Such a "buckling column" portion is relatively stiff under normal loads and will thus prevent undue amplification of the lower frequency vibrations (which are involved particularly in vehicular suspension), but under sharp surges gets softer (per unit of deflection), so as to prevent the transmission of large force impulses to the equipment, and then gets progressively stiffer, so as to stop deflections within the amplitude limitations of the mounting without the need of abruptly acting snubbers.

One simple embodiment, incorporating such a spring element, comprises merely one such spring element secured at its opposite ends respectively to a base plate and a load plate.

A second and preferred embodiment comprises a load spool including two parallel load plates joined by a core, a base member including a base washer, having a large central opening, interposed between and parallel to said load plates, two generally tubular spring elements, as described above, interposed between the base washer and each of the load plates respectively. Said spring elements are suitably secured to opposite sides of the base washer encircling the core and, secured to the inner marginal edge of the base washer, is a collar having vibration and shock attenuating characteristics similar to the spring elements aforementioned.

In the accompanying drawings,

Figure 1 is a plan view of a simple form of mounting embodying the present invention, part of the upper load plate being broken away to expose the interior, the mount being shown in its at rest condition;

Figure 2 is an elevational view of the mounting of Figure 1, partly sectioned along the line 2—2;

Figure 3 is a view similar to Figure 2 showing the parts in their condition when the base plate and load plate are deflected away from each other;

Figure 4 is a similar view showing the parts when the said plates are deflected toward each other a small amount, as might be the case under normal operating conditions, the spring element being shown acting as a column under vertical compression;

Figure 5 is a similar view, showing the mount in its operating condition when said plates are deflected toward each other with sufficient thrust as to cause the spring element to collapse into flexure;

Figure 6 is a similar view, showing the parts when the two plates are deflected laterally relative to each other;

Figure 7:
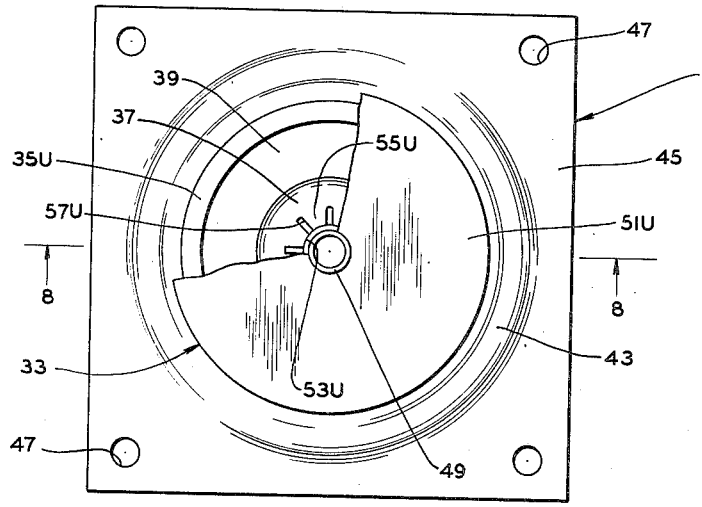
Figure 7 is a plan view of a second type of mounting embodying the present invention, part of the upper plate being broken away to show the interior, the mount being shown in its at rest condition.
Figures 8, 10A, 10B:
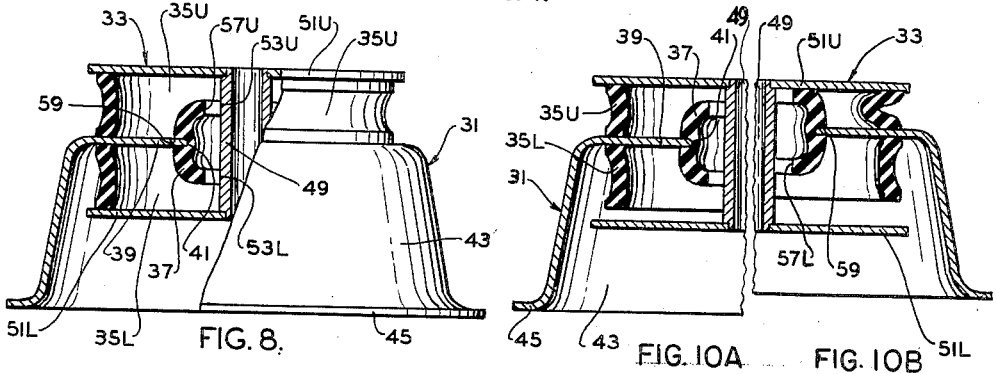
Figure 8 is an elevational view of the mount of Figure 7, partly cross sectioned along the line 8—8.
Figures 11, 12:
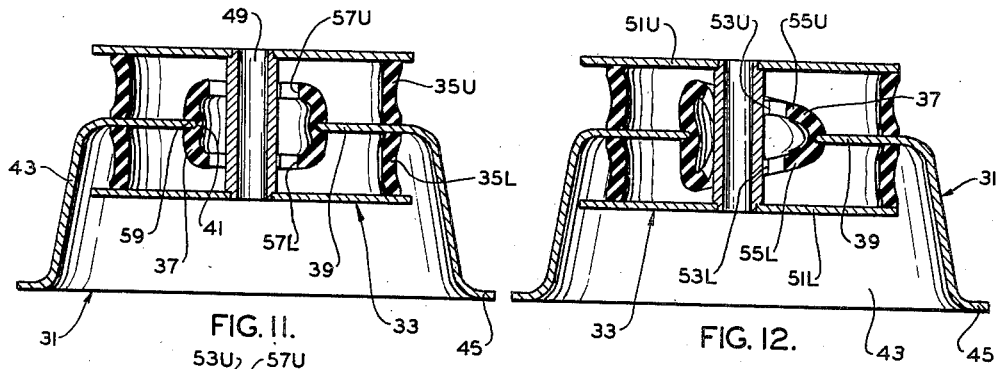
Figure 9:
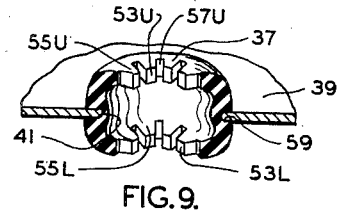
Figure 9 is a fragmentary, vertically sectioned, perspective view of the base plate and spring collar of the mounting of Figure 8.

Figures 10a and 10b are fragmentary cross sectional views of the mount of Figure 7, taken along the line 8—8 of Figure 7, Figure 10a showing the mount in its condition when the base plate is deflected upwardly a small amount as in normal operation so as to cause compression of the upper spring element, and Figure 10b showing it in its condition when said base plate is deflected upwardly almost a maximum amount, as it might be in the event of a sudden upward movement of the base, so as to cause flexure of said upper spring element;

Figure 11 is a cross-sectional view, taken along the line 8—8 of Figure 7, showing the mount when the base plate is deflected horizontally a small amount to the right, so as to cause compression of the spring collar to the left of the core; and Figure 12 is a view similar to Figure 11, showing the mount when the base plate is deflected a greater amount to the right so as to cause flexure of said spring collar to the left of said core.

Referring now more particularly to the embodiment of the present invention illustrated in Figures 1–6, the mounting there illustrated comprises a base plate 11, a load plate 13 and a spring element 15. The base plate 11 is a horizontally disposed square flat metal plate, provided with a centrally positioned large circular opening 17 and four corner holes 19 receivable to bolts, rivets, or other fastening means (not shown) to secure the mounting to a base (not shown). The load plate 13 is a flat circular metal plate, spaced from and above the base plate 11 and parallel to it, and pierced by a small central aperture 21 receivable to a bolt or other fastening means (not shown) so that a load (not shown) may be secured thereto.

The spring element 15 is made of a resilient flexible material, such as natural or synthetic rubber, is generally tubular in shape, is disposed coaxially with the opening 17 and the aperture 21.

The upper annular surface of said tubular spring element 15 is secured to the under surface of the outer peripheral portion of the load plate 13, by any suitable bonding process, and its lower annular surface is similarly secured to the upper surface of the inner marginal portion of the base plate 11.

Said spring element 15 is so shaped that small deflections of one of the plates 11 or 13, vertically toward the other of said plates, will merely cause said spring element 15 to be compressed slightly and shortened in vertical length and so that vertical thrusts of greater force will cause said spring element 15 to buckle inwardly throughout its central circumferential portion and, hence, go into a state of flexure. This may be accomplished by various geometries of the spring element 15, a preferred geometry being that shown in the drawings (particularly Figure 2) where the upper and lower end portions 18U, 18L of said tubular spring element 15 have substantially flat outside surfaces 20U, 20L and slightly concave inside surfaces 22U, 22L, and the central portion 24 of said spring element 15 has a concave outside surface 26 and a substantially flat inside surface 28. It is to be noted also that the ratio of the thickness of the material of the spring element 15 to its length in an axial direction (or its width-to-length ratio) should be such that, under axial thrusts up to a predetermined force, the spring element will be stable and will act as a "column" (undergoing compression), but, under greater thrusts, it will become unstable and will buckle and will go into flexure.

In the operation of the mount just described (Figures 1-6), the base plate 11 and load plate 13 are secured, respectively, by any suitable fastening means (not shown) through the holes 19 and the aperture 21, to two objects to be vibrationally isolated from each other. Thus, the base plate 11 may be secured to the chassis of a motor vehicle (not shown) and a high speed electrical generating plant (not shown) may be fastened to the load plate 13.

When so installed, normal steady state vibrations caused by the generating plant impart vertical oscillations to the load plate 13. Similarly, normal steady state vibrations caused by the power plant of the motor vehicle itself, and minor irregularities of the road over which the motor vehicle is operating, impart vertical oscillations to the base plate 11. These oscillations of the base and/or load plates 11, 13 merely cause alternate vertical tension (Figure 3) and compression (Figure 4) of the spring element 15, so that it acts as a "column."

However, should a vertical thrust of substantial force occur, as might result from a larger than usual bump in the road bed or a ballistic explosion (were the vehicle in military use) the spring element 15 is caused to collapse and bow inwardly (Figure 5) into flexure. Thus it is seen that the mount is first relatively stiff, but becomes softer under greater loads. Toward the end of the flexure stroke the stiffness of the mount increases gradually, so that there is no sudden abrupt snubbing action at the end of the stroke, as is the case in some other mounts.

In the event that either the base plate 11 or the load plate 13 is deflected in a horizontal direction, the spring element 15 is tilted sideways and is put into shear so as to absorb such movements.

Referring now to Figures 7-12, the modified form of mount there shown comprises a base member 31, a load spool 33, upper and lower spring elements 35U, 35L and a spring collar 37.

The base member 31 may be made of sheet metal and comprises a horizontally disposed, circular base washer 39, which is provided with a central circular opening 41. A skirt-like circular housing 43 extends downwardly divergingly from the outer periphery of said base washer 39. A flange 45, of square outer configuration, extends outwardly, horizontally, from the lower periphery of said housing 43 and is pierced by four holes 47, receivable to bolts or other suitable fastening means (not shown).

The load spool 33 is made up of a vertically disposed metal tubular core 49, to the ends of which are securely fastened, as by swaging, welding or otherwise, upper and lower load plates 51U, 51L. The core 49 is positioned coaxially within the opening 41 aforementioned and the load plates 51U, 51L are positioned respectively above and below the washer 39, mentioned above.

The upper and lower spring elements 35U, 35L are generally tubular members of suitable resilient flexible material, and have the shape and characteristics of the spring element 15 of the first form of the present invention (Figures 1-6). Said spring elements 35U, 35L are concentric with the opening 41 and are disposed, respectively, intermediate the washer 39 and the upper load plate 51U, and said washer 39 and the lower load plate 51L. The lower end of the upper spring element 35U is suitably secured to the upper surface of the washer 39, as by a metal-to-rubber bond, and the upper end of the lower spring element 35L is similarly secured to the lower surface of the washer 39. Said spring elements 35U, 35L, however, are not secured to the load plates 51U, 51L at all, but are contiguous therewith, when the mount is in its at rest condition.

The spring collar 37 is also made up of a suitable resilient flexible material, such as natural or synthetic rubber, and is shaped generally like a hollow vehicular tire, with its axis vertically disposed. The upper and lower rims 53U, 53L of said collar 37 snugly encircle the core 49, and the upper and lower walls 55U, 55L are substantially flat, horizontally, and are cut by a plurality of radially disposed slots 57U, 57L. The outer periphery of said tire-shaped spring collar 37 is provided with a circumferential slot 59. The inner peripheral portion of the washer 39 is positioned in said slot 59 and said parts are preferably secured to each other, as by a metal-to-rubber bond.

In the use of the form of the present invention just described (Figures 7-12), the base member 31 and the load spool 33 are secured respectively to two pieces of equipment, etc., which are to be vibrationally insulated from each other. For instance, the base member 31 may be secured to the framework of a motor vehicle (not shown) by means of suitable fastening members (not shown) through the holes 47, and a piece of sensitive electronic equipment (not shown) may be secured to the load spool 33 by means of a suitable fastening member (not shown), such as a nut and bolt extending through the core 49.

When so installed, the base member 31 may be caused to oscillate longitudinally due to vibrations generated in the vehicle's power plant, and normal minor irregularities of the road over which the vehicle may be traveling. Such oscillations of the base member 31 cause the upper and lower spring elements 35U, 35L to act as "columns" under slight longitudinal compression (as already described above in connection with spring element 15). However, in this embodiment, the said spring elements 35U, 35L are compressed, alternately, so that when one is under compression the other is under no stress at all, as it is not bonded to the load spool 33 and therefore merely moves away from the load plates 51U, 51L adjacent to it (as shown in Figure 10a). Thus, it is seen that, under vertical thrusts, this embodiment of the present invention causes alternate compression of the spring elements 35U, 35L, but at no time causes vertical tension thereof (as is the case in the simpler embodiment of Figures 1-6). This is advantageous as tensile loading may cause injury and drift.

When a thrust of large force occurs, however, as when a large bump in a road is negotiated by the motor vehicle, one or the other of the spring elements 35U, 35L collapses and goes into flexure (as illustrated in Figure 10b, and already described above in connection with spring element 15) thereby isolating sensitive equipment from such shocks. Again the other spring element is not subjected to tension.

Horizontal movements of the base member 31 or the load spool 33 are attenuated in a somewhat similar manner. Minor lateral deflections merely cause compression of the upper and lower walls 55U, 55L of the spring collar 37, to one side of the core 49 (as shown in Figure 11) and said walls act as a "column." However, lateral thrusts of greater force cause said walls 55U, 55L, to one side of the core 49, to collapse upwardly and downwardly respectively (as shown to the left in Figure 12) so as to go into flexure, and thus relieve the strain of such horizontal deflections in much the same way as when the spring elements 35U, 35L collapse to relieve substantial vertical thrusts.

Thus, it is seen that the buckling or collapsing feature of the present invention is provided for both horizontal and vertical oscillations, and tensile strains in the spring elements 35U, 35L, are absent entirely.

It is obvious that both of the embodiments illutrated in the drawings have a compliance to rotational movements and the spring elements 15, 35U, 35L and the spring collar 37 will attenuate such movements.

In order to better understand the structure and function of a "buckling column" portion of a spring element, it should be noted that some portions of a spring element may be included only for the purpose of mechanical coupling and arrangement of the several components of a shock mount, but in every spring element of the buckling type, there is a certain portion which, when subjected to axial thrust, acts as pointed out above, that is, it operates in compression as a column under thrusts of lesser degree but it is, nevertheless, free to buckle or collapse into flexure under thrusts of a greater degree.

A spring element is preferably secured or coupled to the other components of a shock mount so that its operation is controlled so that it follows a desired mode of operation. The securing or coupling means may take various forms. For instance, one or both ends of a spring element may be bonded to a metal member (as by a rubber-to-metal bond or by a suitable adhesive) as are both ends of the spring element of Figures 1–6 or it may be secured by suitable clamps (not shown).

Sometimes, however, the ends of a spring element are not actually mechanically secured but they are suitably shaped so that a desired mode of buckling operation occurs. This may be accomplished by having an end of a spring element terminate in a substantially flat and relatively wide surface so that, in operation, it abuts against some other flat surface and does not rotate. One example of this may be seen in Fig. 10b, where the upper end of the upper spring element 35U and the lower end of the lower spring element 35L have fairly wide flat surfaces. Such a surface keeps a spring element in intimate abutment with a flat plate during the buckling phase of the operation of the element. This may be seen clearly in the upper portion of Fig. 10b where the upper end of the upper spring element 35U is flat against the upper load plate 51U although there is no mechanical connection between them.

It is highly significant that this accomplishes a "triple mode" flexure of the spring element 35U, that is, flexure occurs at three different places, viz, at the central portion and also at both ends. This causes a tremendous deformation of the material of the rubber of the spring element which is important for at least three reasons; (1) considerable shock energy is dissipated in the work of deforming the rubber, (2) this occurs over a longer period of time than the time of the shock itself, thereby resulting in isolating a load completely from the shock or at least subjecting a load to a considerably lower and less damaging acceleration than the acceleration of the shock itself, and (3) considerable restoring force is stored up in the triply flexed rubber, which force is needed to bring the spring element back to its unloaded state.

Where no portions of a spring element are used for mechanical coupling of the spring element to other components of a shock mount, then usually all or substantially all of the axial length of the spring element is free to operate in compression-flexure, as already described, and hence its "buckling column" portion extends through the entire spring element. However, where the ends of the spring element are secured by metal clamps or are otherwise constrained as by being widened out considerably so that they are not free to undergo compression at one stage of operation, and to undergo buckling at another stage of operation, such end portions are not included in the "buckling column" portion. An example of the latter may be seen, for instance, in my co-pending application Serial Number 603,735 (now United States Patent 2,532,998) where the ends of the spring elements 39U and 39L are widened out laterally and are also stiffened by the embedded washers 31U and 31L. There the "buckling column" portion is essentially the vertically disposed web intermediate the widened out ends.

To appreciate the superiority of mounts embodying the present invention, some study of load-deflection curves is profitable. Many commercial mounts today have a substantially linear load-deflection curve; that is, deflection and load increase at about a constant ratio except that, toward the end of the curve, the load increases more rapidly than the deflection. Thus, a load-deflection curve for such a mount is a fairly straight slanting line which swings upward steeply toward the end.

Mounts embodying the present invention, on the other hand, as already explained, are relatively stiff at first, then get softer, and finally get stiff again. Thus, a load-deflection curve for such mounts is initially quite steep and then proceeds at a lesser slope and finally swings upward again to the end of the curve.

It should be understood that a shock mount which has the best load-deflection curve is one which, for a given displacement and energy absorption will transmit the smallest forces.

One of the members to which a shock mount is fastened such as the chassis of a motor vehicle in the example mentioned above has a certain kinetic energy due to its movement. This energy must be accepted ideally by the shock mount. The energy is translated in the shock mount to the potential energy involved in straining the resilient material. The potential or strain energy is the work done in deforming the mount and it is equal to the area under the portion of the load-deflection curve traversed. The greater the thrust to which a mount is subjected and, hence, the greater the attendant kinetic energy, the larger the area under the curve.

Thus, it is seen that a mount is most satisfactory when its load deflection curve is such that, for a given deflection, the area under the curve is at a maximum. It is obvious that a load-deflection curve, which is initially steep and then proceeds at a lesser slope (as in the present mount), will provide more area under it and, hence, more energy absorption than a deflection curve which is relatively linear (as is typical of present commercial shock mount practice, as mentioned above).

For thrusts having relatively large energy, it will be understood that, to absorb said energy, a relatively large area under the load-deflection curve is necessary. As the load-deflection curve of the present mount provides such area throughout the beginning of the curve, the deflection of the mount need not be as great as for commercial mounts having a relatively linear curve and, hence, the force transmitted by the present mount is less than that transmitted by such commercial mounts.

Although the embodiments shown in the drawings have particular geometries, it will be understood that various changes in geometry may be made within the spirit of the invention. Such changes in geometry, and changes in relative sizes of elements, and other modifications may be made to suit the present mounting to different compounds of natural or synthetic rubber and to different loading values.

Although the operation of the mounts illustrated have been described only when subjected to direct vertical, horizontal and rotational deflections, it will be understood that deflections in all other directions will merely be combinations of the direct deflections described.

Although a particular mount will obviously be designed with certain loads, vibrations and shocks in mind, it is conceivable that in use a mount may be subjected to unanticipated conditions or it may be used beyond the intended useful life span of its resilient material. Should this occur, in connection with the mounting illustrated in Figures 7–12, the resilient material may rupture or one of the bonds between the spring elements 35U, 35L and the base washer 39 may let go. Nevertheless, the load will not separate from the base and fly into space, as the base member 31 is imprisoned upon the load spool 33.

It will be understood that the mounts described will also operate with the base plate 11 or the base member 31 secured to a load and the load plate 13 or load spool 33 secured to a base.

While there have been described what at present are considered preferred embodiments of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A spring collar for a vibration mounting, comprising a hollow substantially tire-shaped member of resilient flexible material, the walls thereof, at rest, being substantially straight in a radial direction and acting substantially as columns in compression and being relatively stiff, under relatively slight radial thrusts, and collapsing suddenly into flexure and being relatively soft, under thrusts of greater force.

2. A spring collar as set forth in claim 1, wherein the walls, at rest, include a plurality of substantially straight radially positioned spring fingers.

3. A mounting to sustain a load relative to a base, comprising a base plate having an opening therein; a resilient collar secured to said plate and substantially coaxial with said opening; said collar being substantially annular and being provided with substantially radially disposed fingers adapted to compress substantially radially under slight thrusts in a substantially radial direction and to collapse and go into flexure under greater radial thrusts; a load spool, including a core, extending coaxially through said collar and two load plates secured substantially normal to said core; said load plates disposed on opposite sides of said base plate; two tubular spring elements interposed respectively between the two load plates and the base plate, each of said spring elements being adapted to undergo longitudinal compression under relatively slight substantially axial thrusts and to collapse into flexure under greater substantially axial thrusts.

4. A spring collar for a vibration mounting, comprising a substantially tire-shaped member of rubber-like material, the walls of which comprise a plurality of substantially radially positioned spring fingers, each of which fingers, at rest, is substantially straight in a radial direction and acts as a column in compression and is relatively stiff, under relatively slight radial thrusts, and which suddenly collapses into flexure and is relatively soft, under radial thrusts of greater magnitude.

5. A mounting to sustain a load relative to a base, comprising a load spool, said spool including a core and two spaced load plates secured to said core substantially perpendicularly thereto, a base plate having an opening therethrough encircling said core and disposed intermediate said plates, two spring elements disposed between said load plates respectively and said base plate, said spring elements being adapted to allow the said load plates and the base plate to move relative to each other and to insulate them against physical contact with each other, each of said spring elements being adapted to be relatively stiff under slight axial thrusts of the spool relative to the base plate and to become relatively soft under thrusts of greater magnitude, a collar disposed between said base plate and said core and adapted to be relatively stiff under slight radial thrusts of the spool relative to the base plate and to become relatively soft under thrusts of greater magnitude.

6. A mounting as defined in claim 5, wherein each spring element includes a generally tubular member of rubber-like material and wherein the collar includes an annular member of rubber-like material.

7. A mounting to sustain a load relative to a base, comprising a load spool, said spool including a core and two spaced load plates secured to said core substantially perpendicularly thereto, a base plate having an opening therethrough encircling said core and disposed intermediate said plates, and two spring elements disposed between said load plates respectively and said base plate, said spring elements allowing said load plates and said base plate to move relative to each other and insulating them against physical contact with each other, each of said spring elements including at least a buckling column portion which has a length-to-width ratio of at least two to one and which acts as a column primarily in compression under relatively slight axial thrusts of the spool relative to the base plate and collapses suddenly into flexure under thrusts of greater magnitude, each of said buckling column portions, in longitudinal cross section, having one substantially straight side and one concave side, so as to determine the direction in which said flexure takes place.

8. In a mounting to sustain a load relative to a base, a spring element which, at rest, is of greater length than thickness, in longitudinal cross section, and which, throughout both end portions is substantially flat on a first side and concave on an opposite second side and at its central portion is concave on said first side and substantially flat on said second side.

9. A mounting to sustain a load relative to a base, comprising a resilient flexible spring element which is substantially tubular and, throughout both end portions, is substantially flat on tis outer surface and concave on its inner surface and, at its central portion, is concave on its outer surface and substantially flat on its inner surface and which, at rest, is elongated in longitudinal cross section and which has such a width-to-length ratio that, under thrusts of relatively little force, in at least one longitudinal direction, it acts as a column under compression, and which, under thrusts of greater force, collapses laterally into flexure.

10. A buckling type mounting to sustain a load relative to a base, including a buckling column portion of resilient flexible material, which buckling column portion, when unloaded, in longitudinal cross section, has a length-to-width ratio of at least two to one and which, under longitudinal thrusts of relatively little force acts as a column under compression and which, under thrusts of greater force, buckles laterally into flexure, and said buckling column portion, in longitudinal cross section, having one substantially straight side and one concave side, to determine the direction of said buckling.

11. In a buckling type mounting as defined in claim 10 which includes means to prevent the ends of said buckling column portion from rotating, whereby said buckling column portion flexes at at least three places along its length.

12. A mounting as set forth in claim 10, wherein the said buckling column portion, in lateral cross section, is of tubular configuration.

NORMAN E. LEE.

REFERENCES CITED

The following references are of record in the file of this patent:

UNITED STATES PATENTS

| Number | Name | Date |
| --- | --- | --- |
| 1,574,985 | McWain | Mar. 2, 1926 |
| 2,080,919 | Ihln | May 18, 1937 |
| 2,110,701 | Farmer | Mar. 8, 1938 |
| 2,379,763 | Sweet | July 3, 1945 |
| 2,562,195 | Lee | July 31, 1951 |

FOREIGN PATENTS

| Number | Country | Date |
| --- | --- | --- |
| 50,180 | France | Oct. 10, 1939 |
| 145,358 | Austria | Apr. 25, 1936 |
| 385,912 | France | Apr. 2, 1908 |
| 501,167 | Great Britain | Feb. 22, 1939 |
| 620,856 | France | Apr. 30, 1927 |